(12) United States Patent
Wimberger-Friedl et al.

(10) Patent No.: US 8,916,111 B2
(45) Date of Patent: Dec. 23, 2014

(54) FLUID CONTAINER COMPOSED OF TWO PLATES

(75) Inventors: Reinhold Wimberger-Friedl, Veldhoven (NL); Christiane Witz, Lommel (BE); Esther A. W. Janssen, Eindhoven (NL); Bernardus Jacobus Johannes Van Iersel, Eindhoven (NL); Bart Van Nunen, Eindhoven (NL); Marinus Bernardus Olde Riekerink, Bemmel (NL)

(73) Assignee: Koninklijke Philips N.V., Eindhoven (NL)

( * ) Notice: Subject to any disclaimer, the term of this patent is extended or adjusted under 35 U.S.C. 154(b) by 1527 days.

(21) Appl. No.: 11/577,819

(22) PCT Filed: Oct. 13, 2005

(86) PCT No.: PCT/IB2005/053361
§ 371 (c)(1),
(2), (4) Date: Apr. 24, 2007

(87) PCT Pub. No.: WO2006/046164
PCT Pub. Date: May 4, 2006

(65) Prior Publication Data
US 2009/0129986 A1    May 21, 2009

(30) Foreign Application Priority Data
Oct. 27, 2004   (EP) .................................... 04105340

(51) Int. Cl.
*B01L 3/00* (2006.01)
*B29C 65/48* (2006.01)
(Continued)

(52) U.S. Cl.
CPC ....... *B01L 3/502707* (2013.01); *B29C 65/4835* (2013.01); *B29C 66/5346* (2013.01); *B01L 2200/0689* (2013.01); *B29L 2031/756*
(Continued)

(58) Field of Classification Search
CPC .................... B01L 2200/12; B01L 2300/0887; B01L 2300/0636; B01L 2300/0877; B01L 3/5027; B01L 3/502707; B01L 3/502715; B01L 3/502753; B01L 2200/0689; B01L 2300/0627; B01L 2300/0861; B01L 2300/185; B01L 2200/027; B01L 3/50853; B01L 9/527; B01F 13/0059; B29C 65/4835; B29C 66/7465; C12M 23/12; C12M 23/16
USPC ............... 422/100, 500–503; 427/402, 207.1, 427/208, 208.2, 208.4, 208.8
See application file for complete search history.

(56) References Cited

U.S. PATENT DOCUMENTS 5,932,315 A   8/1999   Lum et al.
6,117,395 A   9/2000   Pioug et al.
(Continued)

FOREIGN PATENT DOCUMENTS

EP   0430248   6/1991
EP   1415707 A1 * 5/2004
(Continued)

OTHER PUBLICATIONS

Awatani Y et al: "Damage Free Dicing Method", Optical MEMS, 2002. Conference Digest. 2002 IEEE/LEOS International. pp. 137-138, XP010602742.

(Continued)

Primary Examiner — Dean Kwak

(57) ABSTRACT

The invention relates to a miniaturized fluid container with microchannels (11, 12) which are bordered by ridges (13, 14), wherein the crests of the ridges (13, 14) are glued to a cover plate (20). Additional stability may be achieved by distributing glue (33) in cavities between the microchannels (11, 12), the spreading of said glue being driven by capillary forces.

9 Claims, 2 Drawing Sheets

Figure 1:
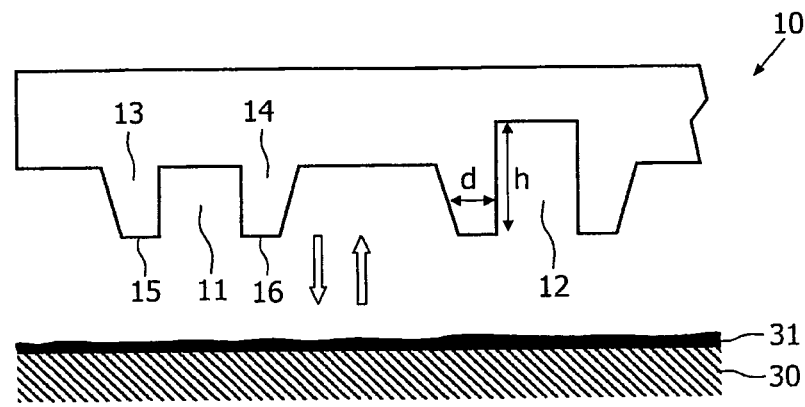

(51) Int. Cl.
    *B29C 65/00*      (2006.01)
    *B29L 31/00*      (2006.01)
    *B29C 65/54*      (2006.01)
    *B29C 65/52*      (2006.01)

(52) U.S. Cl.
CPC ..... (2013.01); *B29C 65/4845* (2013.01); *B29C 65/548* (2013.01); *B01L 2300/0806* (2013.01); *B29C 65/526* (2013.01); *B01L 2300/041* (2013.01); *B29C 66/7465* (2013.01); *B29C 65/521* (2013.01); *B29C 66/54* (2013.01); *B29C 66/114* (2013.01); *B29C 66/112* (2013.01); *B01L 2200/12* (2013.01)
USPC ........... 422/503; 422/500; 422/501; 422/502; 427/402; 427/207.1; 427/208; 427/208.2; 427/208.8

(56) References Cited

U.S. PATENT DOCUMENTS

| | | |
|---|---|---|
| 2002/0045246 A1 | 4/2002 | McMillan et al. |
| 2002/0086436 A1 | 7/2002 | Buechler |
| 2003/0180190 A1* | 9/2003 | Corcoran et al. ............. 422/102 |
| 2004/0156753 A1* | 8/2004 | Roitman et al. ............. 422/100 |

FOREIGN PATENT DOCUMENTS

| | | |
|---|---|---|
| WO | 0154810 | 8/2001 |
| WO | 03059804 | 7/2003 |
| WO | 03062133 A2 | 12/2003 |

OTHER PUBLICATIONS

Huang Z et al; "A Method for UV-Bonding", vol. 22 NR-18 pp. 3924-3929, 2001.

* cited by examiner

FLUID CONTAINER COMPOSED OF TWO PLATES

The invention relates to a miniaturized fluid container with microchannels that is composed of a structured plate and a cover plate and to a method for manufacturing such a container.

Miniaturized fluid containers are applied in an increasing number of tasks, particularly in the analysis of medical, chemical, or biochemical samples. A typical way to produce such containers is to etch necessary structures like microchannels into a plate and to put said structured plate together with a flat cover plate.

Such a method is for example described in WO 01/54810 A1, wherein the cover plate is coated with a thermoglue that is cured after putting the cover plate and the structured plate together. Two main disadvantages of this approach are the poor control of the channel height due to tolerances on the parts and the glue thickness, and the thermal load on the inner channel surfaces which can destroy certain (bio-)chemical treatments required for the functioning of the device. Glue can also be squeezed into the micro channels or local gaps may be created due to a bad process control.

Based on this situation it was an object of the present invention to provide a miniaturized fluid container and a simple method for manufacturing it with definite, reproducible dimensions of the microchannels.

This object is achieved by a miniaturized fluid container according to claim 1 and a method according to claim 9. Preferred embodiments are disclosed in the dependent claims.

According to its first aspect, the invention relates to a miniaturized fluid container, wherein the term "miniaturized" refers to the fact that the structures of the container (particularly its microchannels) have dimensions in the range of 1 to 1000 μm, preferably 10 to 100 μm. Alternatively one can say that a miniaturized fluid container is designed to process sample volumes from typically 100 nl to 1 ml. The fluid container comprises the following components:

a) A so-called "structured plate" that is characterized by at least two neighboring ridges which project from one side of the plate (preferably at an angle of about 90°), wherein the crests of said ridges lie at the same height, i.e. in the same plane parallel to the principal plane of the structured plate. Moreover, the ridges constitute two borders of a microchannel of the fluid container, wherein the microchannel typically is a part of a larger system of microchannels and other cavities.

It should be noted that the aforementioned characterization of the "neighboring ridges" is to be understood on a local basis, i.e. the at least two ridges may actually be sections of one long continuous ridge that forms a loop.

b) A "cover plate" that is attached to the structured plate, for example by gluing, and that contacts the at least two ridges at their crests, wherein the region of contact between the crests and the cover plate is preferably embedded in a sealing material. The side of the cover plate that contacts the structured plate may particularly be flat (completely or at least in the contact area). Moreover, the cover plate may directly contact the crests of the ridges with the optional sealing material surrounding the contact area, or there may be a (small) distance between the cover plate and the crests that is filled by the optional sealing material. The structured plate and/or the cover plate may for instance be made from glass, silicon, or a suitable polymer.

In the aforementioned fluid container, the microchannels are bordered by comparatively narrow ridges ending at the same height. This guarantees that the cover plate is supported at the crests of the ridges and not at more or less randomly distributed points a distance away from the microchannels. Moreover, ridges lend themselves very well for ultrasonic bonding, wherein vibrational energy is converted into heat at the friction points, i.e. the contact areas between the structured plate and the cover plate. In such a case the ridge material melts locally without heating the surrounding, and no glue is required. If a sealing material is applied, the embedding of the contact region between crests and cover plate in said material guarantees are tight closure of the microchannels which have definite dimensions and particularly a height determined by the height of the ridges. The plates may also have integrated active elements for fluid manipulation and sensing purposes.

The ridges may in principle have any shape or cross section, for example rectangular, trapezoidal, half circular or the like. Preferably, the ratio of the width of the ridges (or more generally the mean width in case of ridges with a cross section of non-uniform width) to the height of the ridges (measured from the bottom of the associated microchannel to the crest of the ridge) lies in the range from 0.1:1 to 1:0.1. In other words, the width of the ridges corresponds to between 0.1 and 10 times their height, more preferably to between 0.3 and 3 times their height.

In case of acute, tapered ridges, the crests correspond to lines. In a preferred embodiment, however, the crests of the ridges are flat, for example having the form of narrow stripes. The width of said crests (measured transversely to the extension of the ridges along the associated microchannel) typically ranges from about 0.1 to 1 times the average width of the ridges. Ridges with flat crests are more easily to produce with a precise height and provide a larger and better contact region to a covering plate.

The purpose of the optional sealing material is to embed the contact region between ridges and cover plate, thus compensating any surface irregularities there and sealing the connection. To achieve these objectives, the sealing material preferably has a soft (e.g. liquid or plastic) consistency during manufacturing such that it can readily adapt to the shape of ridges and cover plate. In a preferred embodiment, the sealing material is a glue that seals the connection and simultaneously fixes the structured plate to the cover plate when cured. Various types of glues may be applied for this purpose, from PSA (pressure sensitive adhesive), thermoplastic materials, to cross-linking materials, like epoxies or acrylates, which can be cured by irradiation or heating or upon mixing. An advantage of UV-curable acrylates is that the curing reaction can be switched on at any point in time and in this way decouple the application of the glue and the assembly from the chemical reaction.

In order to provide or improve the attachment of the cover plate to the structured plate, remaining cavities between the plates may partially or completely be filled with a glue.

According to a preferred embodiment of the fluid container, the structured plate and/or the cover plate comprise(s) at least one opening which directly or indirectly gives access to the microchannel defined by the ridges.

The invention further relates to a method for manufacturing a miniaturized fluid container, particularly a fluid container of the aforementioned kind. The method comprises the following steps:

a) Preparing a structured plate with at least two neighboring ridges which project from one side of the plate with their crests lying at the same height and which form or border a microchannel between them.

b) Providing a cover plate that may for example be simply flat or that may be structured.

c) Putting the structured plate and the cover plate together such that the crests of the ridges contact the cover plate. In this state the two plates may also be permanently attached to each other, e.g. by ultrasonic bonding.

The aforementioned method allows to produce a fluid container of the kind described above. Reference is therefore made to the preceding description of said container for more information on said method, its modifications and advantages.

According to a preferred embodiment of the method, a sealing material (for example a liquid glue) is applied to the crests of the ridges of the structured plate and/or to one side of the cover plate before step c). The sealing material preferably has a soft consistency during application and solidifies after step c). The sealing material then embeds the contact region between the two plates (only).

The application of the sealing material to the crests of the ridges may be achieved by any suitable method. Preferably, the crests of the ridges are provided with a sealing material by dipping them into a layer of liquid sealing material. Said layer may be the surface of a deeper pool of sealing material or it may be a comparatively thin layer of liquid sealing material spread over the flat surface of a carrier. The latter alternative has the advantage that the depth of the dipping can easily be controlled by the thickness of the layer on the carrier, thus preventing an excessive wetting of the structured plate with sealing material.

According to a further development of the method, at least one cavity that remains between the structured plate and the cover plate after putting them together in step b) is filled with a glue by capillary forces. Said glue may provide or at least enforce the required connection between the structured plate and the cover plate. As the microchannels in the structured plate are tightly closed by the cover plate on the ridges and the sealing material, an undesirable spreading of the additional glue into the microchannels is prevented.

Figure 2:
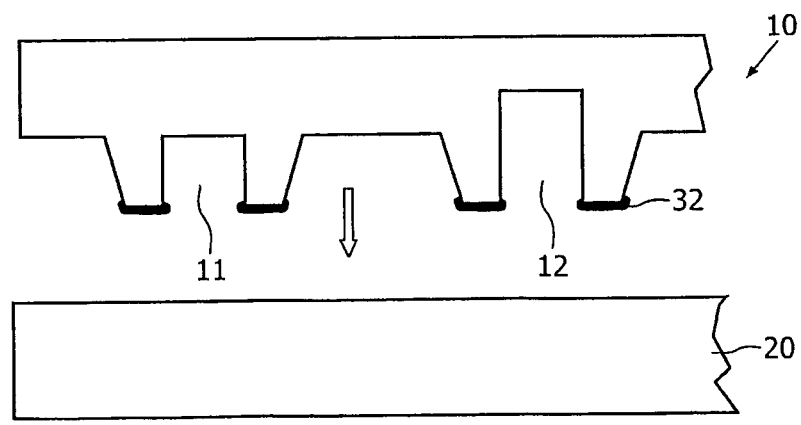
Figure 4:
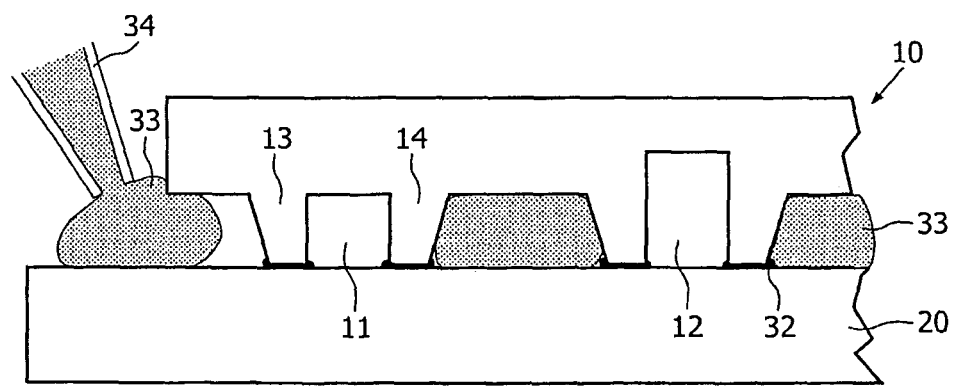

In the following the invention is described by way of example with the help of the accompanying drawings in which:

FIG. 1 shows as the first step of the manufacture of a fluid container according to the present invention the dipping of a structured plate into the glue;

FIGS. 2 and (3) show as second step the assemblage of the structured plate and a cover plate;

FIG. 4 shows as third step the spreading of additional glue in cavities of the fluid container.

Microfluidic devices are of great interest for many areas from electronics cooling to biosensors. Usually, microchannels of said devices are made by creating trenches in one substrate (e.g. silicon, glass, or plastic), and covering this structured substrate with a flat cover plate. For small channels it is very critical to have a precise channel definition (because the flow resistance scales with the 4th power of the channel height), which is not only determined by the structuring of the substrate, but also by the bonding process of the cover.

Basically, one can use a variety of techniques for bonding, either direct bonding, which means a direct adhesion of the cover and the substrate, or mediated bonding, where an extra "glue" layer is used to achieve the bonding. Direct techniques are limited in the possible material combinations. For low cost devices the substrates are typically made of plastic.

With plastics direct bonding can only be achieved by thermal processes, where the material has to be melted locally to achieve a good contact and a sufficient strength. The energy for melting can be supplied from hot surfaces, radiation, ultrasound, or absorption of laser radiation. Melting can only be achieved with thermoplastic materials and excludes cross-linked materials. Melting the surface of the microchannels locally destroys any surface treatments, which have been applied prior to bonding. Melting is always accompanied by deformation and due to creep under the applied load or recovery from molding stresses present in the substrate. Thermal bonding always requires pressure to assure a good contact. In practice it is very difficult to control pressure locally due to small tolerances in the height and flatness of the structured substrate and the local pressure depends on the contact area which is determined also by the channel layout.

Mediated bonding requires a glue layer between the structured substrate and the cover. The thickness of the glue adds to the channel height and must be controlled carefully. The glue material is in contact with the interior of the channels and in this way affects the flow behavior and can interfere chemically with the liquids inside the channels. The flow behavior is affected by both the mechanical and the physical surface properties, like roughness and wetting behavior. This limits the number of potential materials and application technologies for critical applications like biosensor cartridges.

While glue mediated bonding is the most attractive technology for polymer based fluidic systems the problems of glue penetration into the channels on the one hand and incomplete wetting of the contact surfaces on the other hand (creating capillaries around the channels) need to be solved. The contact area of the glue and the channel walls needs to be minimum. The method disclosed here provides a perfect channel sealing with the absolute and controllable minimum of glue exposure in the channels. The quality of the seal is independent of the channel layout and the size of the microfluidic system. No forces need to be applied during bonding. Since contact areas are small, shrinkage of the glue will not lead to warpage of the assembly. Reasonable part tolerances can be allowed since the application method is self stabilizing.

FIG. 1 illustrates the first step of the manufacture of a miniaturized fluid container according to the present invention. The Figure schematically depicts in a side view a section through a small part of a structured plate 10 which may for example consist of a transparent polymer substrate. On the lower side of the plate 10, the required structure is provided by means known in the art. From the functional components of the fluid container, two microchannels 11 and 12 of different height are shown in a cross section. While normally such microchannels are etched or machined into a flat surface, the microchannels 11, 12 at least partially bordered by ridges 13, 14 projecting vertically from the lower side of the structured plate 10. In the shown example, the ridges 13, 14 have a trapezoidal cross section with a wider base and a smaller crest, wherein the crests 15, 16 of all ridges are flat and lie at the same height (i.e. in one plane). The mean width d of the ridges is approximately as large as their height h in the case shown here, with a typical value being d=h=70 µm. In general, the ratio d:h may range from 0.1 to 10.

The ridges 13, 14 can for instance be produced by direct micromachining of the channel plate or by a master which is then replicated by molding or embossing techniques. A preferred technology for the production of such a master is the so-called LIGA (Lithographie, Galvanoformung, Abformung) process, consisting of lithographic structuring of a resist material on a substrate, replication of that structure in a Ni-shim by electroplating and using that Ni-shim as a mold insert for (injection) molding of a polymer. As an alternative for the Ni-shim also deep etched silicon or glass can be used.

FIG. 1 also shows a carrier 30 covered with a thin layer 31 of a liquid glue. As indicated by the arrows, the structured plate 10 is dipped into said glue layer 31 in order to cover the crests 15, 16 of the ridges 13, 14 with controlled quantities of glue 32 (cf. FIG. 2). The amount of glue depends on the width of the crests, the viscosity of the glue and the depth of immersion.

Figure 3:
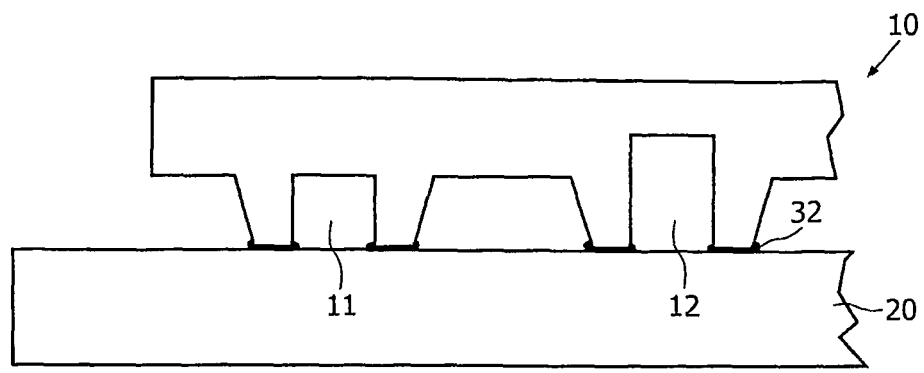

As can be seen from FIGS. 2 and 3, the structured plate 10 is then put together with a flat cover plate 20 that may for example consist of the same material as the structured plate 10. The cover plate 20 may be unstructured or it may contain structures which are aligned to the surface to achieve contact with the ridges where required. The crests 15, 16 of the ridges 13, 14 come into (direct) contact with the inner surface of the cover plate 20, with the glue 32 being distributed according to the wetting behavior of the cover plate 20. After equilibration the glue is cured by either radiation or by heat to provide a firm binding between the plates 10, 20.

If there are large horizontal distances between the microchannels 11, 12 on the structured plate 10, correspondingly large unconnected regions between the plates 10, 20 may result. In order to improve the bonding, additional ridges may be provided on the structured plate 10 in such cases, wherein these "dummy ridges" are not needed as borders of a microchannel but only for reasons of stability.

FIG. 4 shows a further step that may optionally be executed to improve the bonding between the structured plate 10 and the cover plate 20. In this step, empty spaces or cavities that have no function in the resulting fluid container are filled with a glue 33. The distribution of said glue 33 may be readily achieved by applying it from a nozzle 34 at an open edge of the fluid container, from where the glue 33 spreads between the cover plate 20 and the structured plate 10 driven by capillary forces. The glues suited for this purpose need to have a low viscosity (10-10000 mPas) to allow capillary flow and they should cure at room temperature to avoid destructing biomaterials in the sensor. Cyano-acrylates, acrylates, epoxies and silicones are suitable candidates for this application. The gap between the two plates 10, 20 should be small enough (about 0.015-0.5 mm) to enable adhesive flow through capillary forces.

In cavities that have no connection to the edges of the fluid container, the glue 33 may be applied through holes in the cover plate 20 or the structured plate 10 (not shown). As the connections between the ridges 13, 14 and the cover plate 20 are tightly sealed by the first glue 32, the additional glue 33 cannot advance into the microchannels 11, 12 and possibly cause adverse effects there.

The method described above is suited for all kinds of material combinations and channel geometries and has been tested experimentally with success. In such experiments, microfluidic channel devices were for instance produced according to the proposed method from injection-molded polyolefinic (Zeonex 48 R) structures and transfer-molded epoxy substrates. A glue layer (acrylate mixture with initiator Irgacure) of 8 μm thickness was spin-coated on a silicon wafer. After treatment with oxygen plasma, the Zeonex structures were dipped in that glue layer and then transferred to the epoxy substrate where they were applied without force and the glue was cured by irradiation with UV-light. Similarly, channel structures were obtained by UV-replication with the same resin, which is used for the gluing, from a master on a glass substrate. These structured specimens were bonded to glass substrates treated with aminosilane (A1120) by the same method with success.

In another embodiment of the invention, the glue may be applied by spin coating on the cover plate after which the structured plate with the ridges is applied in the still liquid glue layer. In this way channel spilling is avoided, too. This method is useful for applications where the cover plate contains no functional elements, which would be spoiled by the glue layer. Special treatments of the channel walls for instance for biological interactions need to be applied after closure of the system in this case.

The cycle time of the aforementioned bonding process is short and makes it suitable for industrialization. The first step in this process involves pick-up, alignment and placement of the two parts, which will take about 1 to 5 s. In the next step, adhesive is applied, e.g. by automatic dispensing, which takes about 0.5 to 2 s. The adhesive will start flowing immediately and a complete filling will be reached within about 5 s. Cyano-acrylate adhesive cure within seconds at room temperature without any additional equipment. Light curing adhesives also cure within seconds, but need a light source.

The structured plate 10 and/or the cover plate 20 may comprise openings or holes (not shown) which originate inside the microchannels 11, 12 in order to create access from outside for loading or dispensing.

The methods described above allow a reliable and robust assembly of a fluid container independent of the fluidic layout. They are important for all applications of microfluidics, like point-of-care diagnostic devices, biosensors, gas sensors, cooling of electronics and light sources, lab-on-a-chip, in particular those which use plastic channel materials.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. Miniaturized fluid container, comprising
    a) a structured plate with at least two neighboring ridges, each having a flat crest, and each projecting from one side of the plate with said crests lying at the same height (h) and which define a microchannel between them;
    b) a cover plate that it is attached to the structured plate and contacts the at least two ridges at their crests;
    wherein the mean width (d) of the ridges is 0.1 to 10 times their mean height (h); and,
    wherein the contact region between the cover plate and the crests is embedded in a sealing material, preferably in a glue, and
    wherein at least one cavity between the structured plate and the cover plate is filled with a glue.

2. The fluid container according to claim 1, characterized in that the crests of the ridges have a width that is about 10% to 100% of the average width of the ridges.

3. Fluid container according to claim 1, characterized in that the surface of the cover plate that contacts the structured plate is essentially flat in the contact areas.

4. The fluid container according to claim 1, characterized in that the mean width(d) of the ridges is less than 100 μm.

5. A method for manufacturing a miniaturized fluid container, comprising the following steps:
    a) preparing a structured plate with at least two neighboring ridges, each having a flat crest, and each projecting from one side of the plate with said crests lying at the same height (h) and which define a microchannel between them;

b) providing a cover plate;

c) assembling the structured plate and the cover plate such that the crests of the ridges contact the cover plate;

wherein the mean width (d) of the ridges is 0.1 to 10 times their mean height (h);

wherein a glue sealing material is applied to the crests of the ridges of the structured plate; and, characterized in that at least one cavity between the structured plate and the cover plate is filled with a glue.

6. The method according to claim 5, characterized in that the sealing material applied to the crests of the ridges of the structured plate is applied preferably by dipping them into a layer of liquid sealing material, and/or to one side of the cover plate.

7. A method for manufacturing a miniaturized fluid container, comprising the following steps:

a) preparing a structured plate with at least two neighboring ridges, each having a flat crest, and each projecting from one side of the plate with said crests lying at the same height (h) and which define a microchannel between them;

b) providing a cover plate;

c) assembling the structured plate and the cover plate such that plate contacts the at least two ridges at their crests; and, d) sealing the contact region between the cover plate and the crests by ultrasonic bonding;

e) filling at least one cavity between the structured plate and the cover plate with a glue.

8. Miniaturized fluid container, comprising a) a structured plate with at least two neighboring ridges, each having a mean width (d), each having a flat crest, and each projecting from one side of the plate with said crests lying at the same height (h) and which define a microchannel between them;

wherein the ridge mean width is narrow relative to the width of the structured plate; and, b) a cover plate that it is attached to the structured plate and contacts the at least two ridges at their crests;

wherein the contact region between the cover plate and the crests is embedded in a sealing material, preferably in a glue; and, wherein at least one cavity between the structured plate and the cover plate is filled with a glue.

9. The fluid container according to claim 8, characterized in that the mean width(d) of the ridges is less than 100 μm.

* * * * *